April 29, 1958

F. O. HESS 2,832,580

CONVECTION HEATING UNIT

Filed Feb. 9, 1955

INVENTOR.
FREDERIC O. HESS
BY
ATTORNEY.

April 29, 1958     F. O. HESS     2,832,580
CONVECTION HEATING UNIT
Filed Feb. 9, 1955     3 Sheets-Sheet 2

*INVENTOR.*
FREDERIC O. HESS
BY
ATTORNEY.

April 29, 1958     F. O. HESS     2,832,580
CONVECTION HEATING UNIT

Filed Feb. 9, 1955     3 Sheets-Sheet 3

*INVENTOR.*
FREDERIC O. HESS
BY
*E. W. Mason*
ATTORNEY.

United States Patent Office 2,832,580
Patented Apr. 29, 1958

2,832,580

CONVECTION HEATING UNIT

Frederic O. Hess, Philadelphia, Pa., assignor to Selas Corporation of America, Philadelphia, Pa., a corporation of Pennsylvania Application February 9, 1955, Serial No. 487,194

12 Claims. (Cl. 263—19)

The present invention relates to gas burners and more particularly to a gas burning unit that is adapted to produce and distribute hot products of combustion for use in convection heating of ovens and the like.

It is an object of the invention to provide a self-contained heat producing unit that can be inserted in the walls of an oven or the like. It is a further object of the invention to provide a burner unit that can be inserted in the wall of a space to be heated which unit has means in it to produce hot gases and to circulate those gases in a predetermined manner throughout the space.

Another object of the invention is to provide a hot gas producing and distributing unit that can be used in the walls of any type of heating structure that requires the circulation of heated gases therein.

The invention includes a self-contained unit in which burning of a combustible mixture takes place, and from which the products of combustion are discharged. As these products are discharged, they are distributed by a fan in some predetermined pattern while they mix with and impart their heat to the surrounding atmosphere. The units can be used singly or in groups depending upon the heating requirements they are to satisfy. In any case, the units may be individually adjustable, or a number of them may be simultaneously adjusted as a group.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
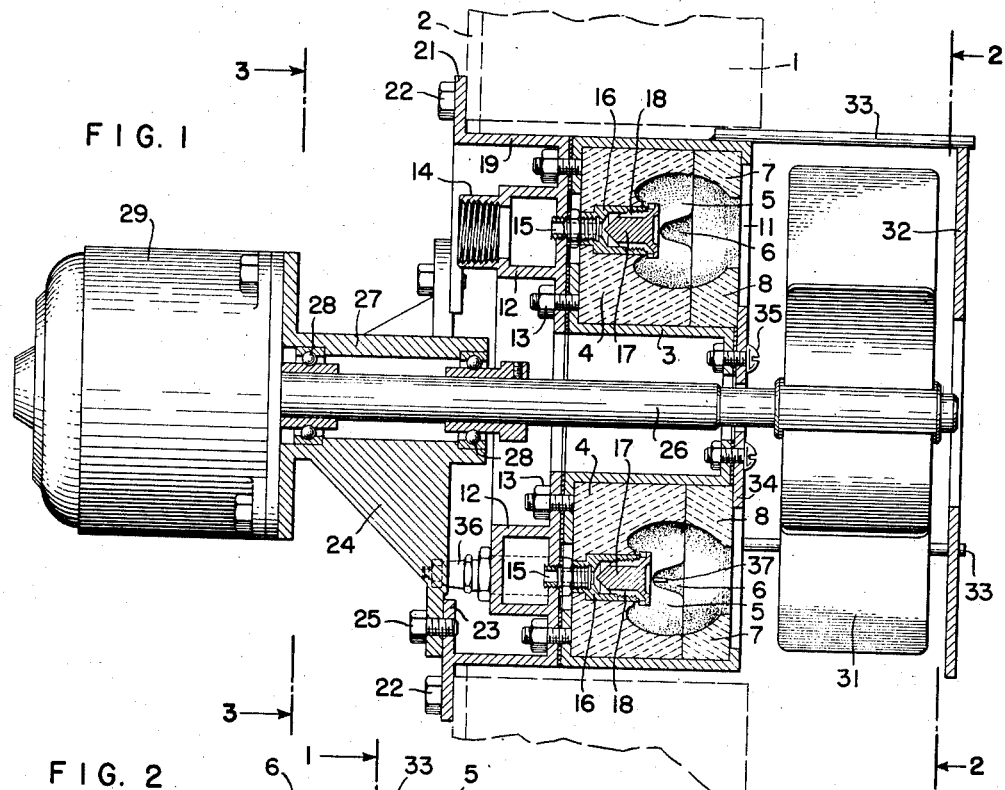
Figure 1 is a section through one form of the heating unit taken on line 1—1 of Figure 2.
Figure 2:
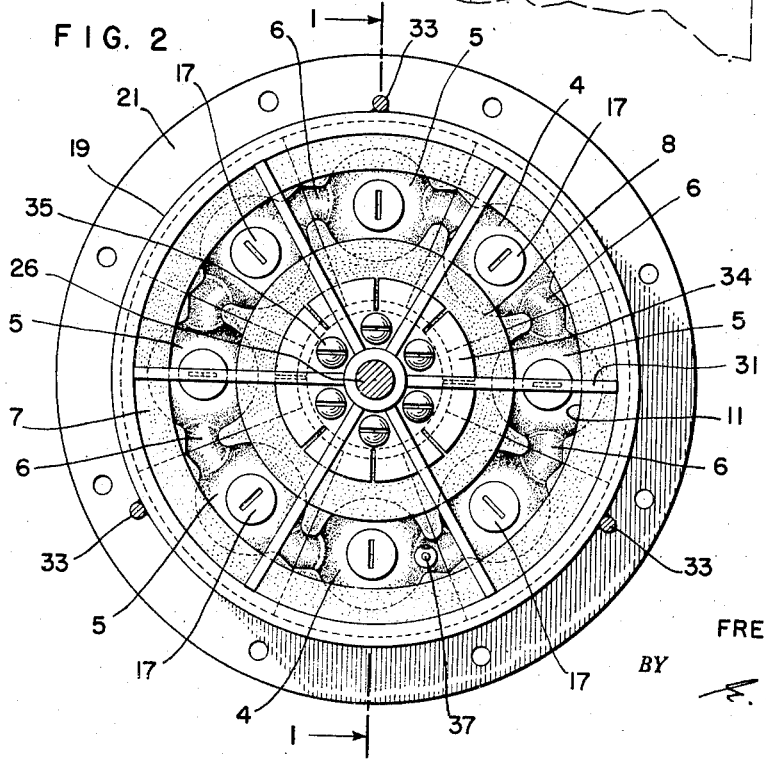
Figure 2 is a front view of the unit taken on line 2—2 of Figure 1.

Referring to Figure 1, there is shown in section a portion 1 of the refractory wall of a furnace with the outer metal backing plate 2. This wall is provided with an opening through which the heating unit of the present invention is inserted. The heating unit includes an annular channel 3 in which is located a refractory ring consisting of a plurality of segmental shaped refractory blocks 4, each of which has a cup-shaped depression 5 formed in front thereof with an opening extending from the base of the cup to the opposite face. Each block is also provided with a groove 6 on each side that connects with similar grooves on the adjacent blocks. Cooperating with the outer edges of the refractory blocks is an outer refractory ring 7 and an inner refractory ring 8. These two rings in combination with the refractory blocks form an annular combustion chamber having a series of substantially spherical enlargements that are in communication with the interior of the oven, or other heating apparatus in which the heating unit is located, by means of the annular slot 11 between rings 7 and 8.

Fuel is supplied in the form of a combustible mixture to the chamber at the various enlargements or cups 5. To this end, there is provided a substantially annular manifold 12 that is bolted to the radially extending portion of the channel 3 by bolts 13. This manifold is provided with a fuel supply connection 14. Adaptors 15 are threaded into openings provided in the front wall of the manifold 12, with each adaptor being concentric with an opening formed in the base of one of the cups 5. Fuel flows from the manifold through the adaptor into a tip holder 16 that is made of a suitable alloy and which is threaded on to the adaptor through the front of the burner unit. This tip holder fits snugly in the opening provided in the base of the cup and extends slightly above the surface thereof. Into this holder is threaded a tip 17 that is provided on its surface with a plurality of axially extending slots that terminate in the cup 5 in a generally radial direction, as best shown in Figure 1 of the drawings.

Manifold member 12 has formed as a part thereof an axially extending sleeve 19 which, in connection with the outer axially extending portion of the channel 3, forms a metal shell for the heating unit of a length that is equal to the thickness of the wall of the oven. On the left or back end of sleeve 19 is an outwardly extending radial flange 21 by means of which the unit is fastened in position by bolts 22 to the back of the oven wall. By merely removing these bolts, the entire unit can be withdrawn from the oven to be replaced by a similar unit if such is necessary.

Sleeve 19 is also provided with inwardly extending lugs 23 to which a spider member 24 is fastened by means of bolts 25. Member 24 has a sleeve 27 which receives bearings 28 coaxial with the unit and in which a shaft 26 is journaled. The shaft is rotated by a motor 29 that is also mounted upon spider 24. The right end of shaft 26 extends into the oven chamber concentric with the refractory ring and has mounted on it a fan 31 which may be of any desired type. As shown herein, this fan is of a type that is intended to move the air in a generally radial direction. In order to insure that the air will move only in a radial direction, there may be provided, if desired, an annular shield or disc 32 in front of the fan. This disc is supported by rods 33 that are welded to the outer periphery of channel 3. The space between the shaft 26 and the inner portion of the channel 3 is closed by a disc 34 fastened to a radially extending flange on the channel by means of bolts 35. This disc not only serves to prevent flow of furnace gases around the shaft and the exterior of the furnace, but it also serves to hold ring 8 in position in channel 3.

The fuel mixture that is supplied to the combustion chamber may be ignited in any suitable manner. As shown herein, however, a spark plug 36 is threaded in back of channel 3 with its electrodes 37 extending into one of the grooves 6 adjacent to a cup 5. A spark from these electrodes will serve to ignite the fuel mixture flowing into the cup nearest thereto. Ignition of one supply of fuel mixture will flash through the grooves 6 and around the unit to ignite the fuel mixture flowing into each of the cups of the combustion chamber.

In the operation of the device, a supply of fuel in the form of a combustible mixture of gas and air is introduced into the manifold 12. From here, the mixture will flow through adaptors 15, holders 16 and the grooves 18 of tips 17 to be discharged into each of the enlargements or cups in a series of radially directed jets. These jets are ignited to burn within the combustion chamber. Hot products of combustion are then discharged through the annular slot 11 into the interior of the oven or other space to be heated. As these products of combustion are discharged into the space, they are directed by means of fan 31 through the space to be heated to create a flow of hot gases that are mixed with and diluted by the atmosphere of the space. The flow of these gases is determined by the type of fan that is being used. It will be apparent that the amount of heat that is produced can be varied by varying the supply of fuel and, therefore, the volume of the hot products of combustion. It will also be apparent that the velocity of the gases will be determined by the speed with which the fan is rotated, and that their direction will be determined by the type of fan which is being used and by whether or not a shield is placed in front of this fan. It is noted that disc or shield 32 not only helps to control the direction in which the gases are discharged by the fan, but it also serves to shield completely the interior of the oven from any radiant heat that may be directed thereto through the annular slot 11 from the combustion chamber.

Figure 4:
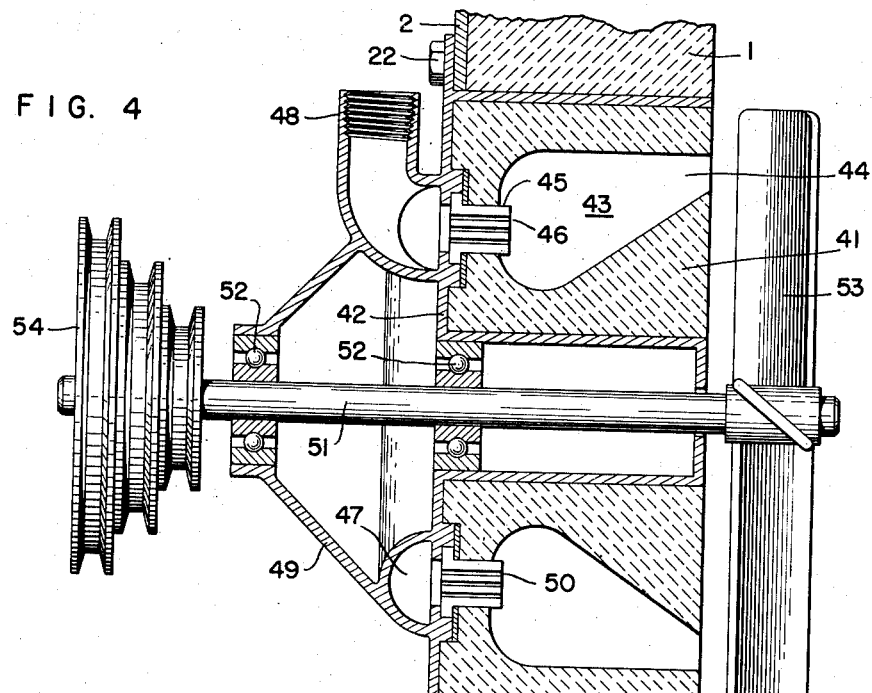
Figure 4 is a section view of a modified form of heating unit.
Figure 3:
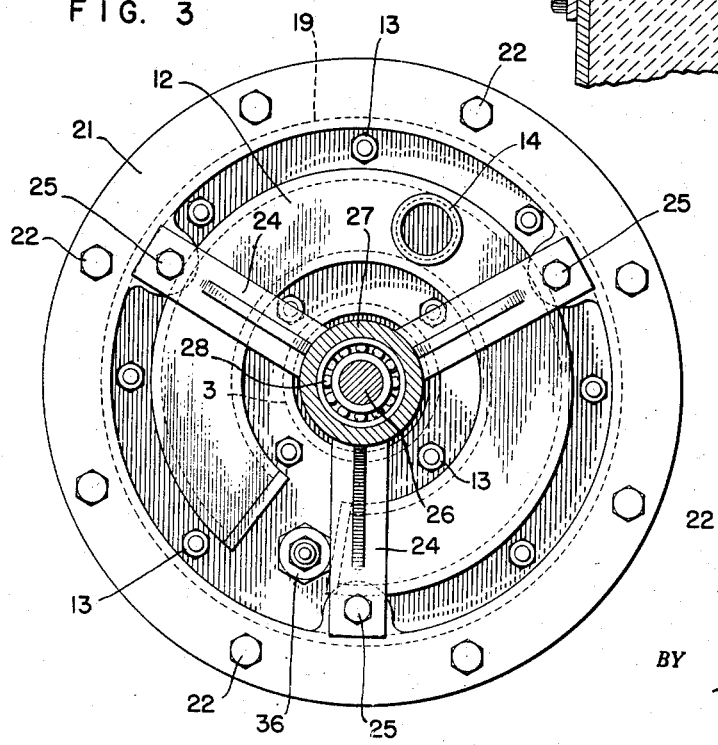
Figure 3 is a back view taken on line 3—3 of Figure 1.

The embodiment of the invention disclosed in Figure 4 differs from that previously disclosed primarily in the shape of the combustion chamber. In this embodiment, there is provided a refractory ring 41 that is held in position in metal shell 42. This shell is fastened in an opening in the oven wall in a manner similar to that previously described. The refractory ring is provided with an annular combustion chamber 43 having an outlet 44 through which the products of combustion are discharged, and an annular inlet 45 through which the fuel mixture is introduced. As shown herein, the fuel mixture is introduced through an annular screen 46 located in inlet 45 and which may be made of a plurality of stacked ceramic plates each of which is provided with a number of small passages 50 through which the fuel mixture will flow into the chamber where it is ignited. Formed as a part of the back portion of the shell 42 is an annular manifold 47 that communicates with the rear of each of the passages 50, the manifold being supplied through a suitable pipe connection 48.

The shell 42 has arms 49 extending backwardly therefrom in which a fan shaft 51 is journaled in bearings 52. The shaft has an axial type of fan 53 on the front thereof, in the oven chamber, and is driven by a pulley 54. As shown herein, the shell 42, manifold 47 and arms 49 are of a one piece construction. It will be apparent, however, that these parts can be made individually in the most convenient manner and fastened together by suitable fastening means.

The operation of this embodiment of the invention is similar to that previously described. The fuel introduced around the chamber 43 through passages 50 burns in the combustion chamber, and the products of combustion are discharged through outlet 44. As the products are discharged, they enter the gas stream from the fan and are directed axially into the oven chamber. It will be apparent, however, that a fan of the type disclosed previously may be used if it is so desired. As long as a fan is used to distribute the products of combustion and to mix these products with the atmosphere of the oven chamber in accordance with some predetermined pattern, the exact type of fan is immaterial.

Figure 5:
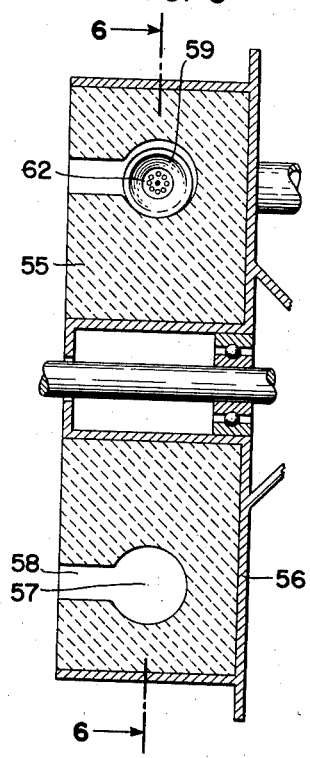
Figure 5 is a section view of another modified form of heating unit taken on line 5—5 of Figure 6.
Figure 6:
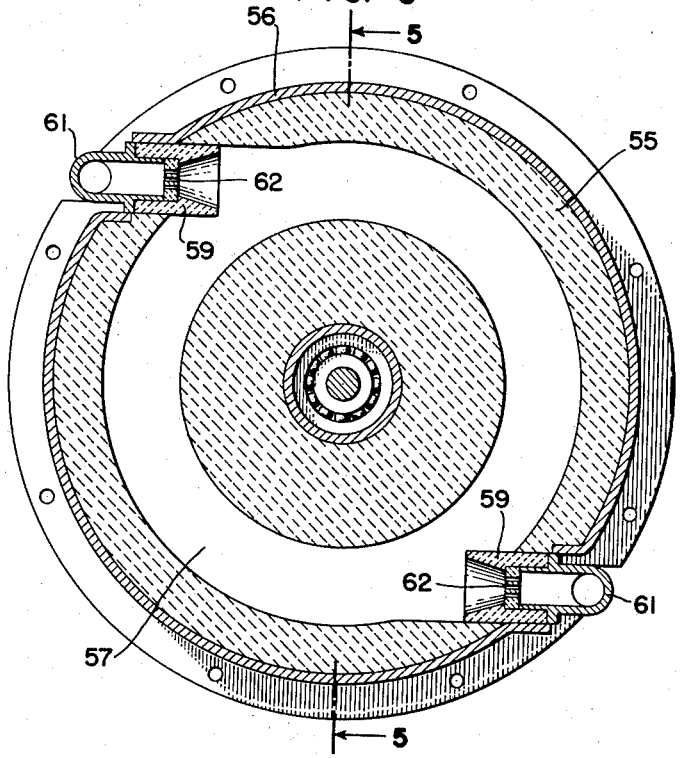
Figure 6 is a view taken on line 6—6 of Figure 5.

The embodiment disclosed in Figures 5 and 6 is similar to those previously described except for the manner in which the fuel is introduced into the combustion chamber. In this case, there is provided a ring 55 of refractory material that is held in a shell 56 as in the previously described embodiments. The combustion chamber 57 is annular and substantially circular in cross section and has an annular outlet 58. Fuel is introduced into the combustion chamber in a plurality of tangentially directed supplies. To this end, there is provided a pair of burner blocks 59 which enter into the chamber tangentially as is shown best in Figure 6 of the drawing. Each of these blocks cooperates with a fitting 61 to hold a burner screen 62 in position. This screen is provided with a plurality of openings through which the fuel is introduced. It will be obvious that any necessary number of burners can be used to introduce fuel to the combustion chamber.

In operation, the fuel burns in elongated flames extending around the combustion chamber, so that the products of combustion will be discharged substantially evenly around the entire length of the outlet 58. The extension of the flame from the two inlets around the combustion chamber is helped by the action of the rotating fan that is used in conjunction with this embodiment. The fan will not only move the products of combustion away from the unit in a manner depending upon the type of fan that is used, but it will also tend to elongate the flame, so that there will be even burning around the entire combustion chamber.

Figure 7:
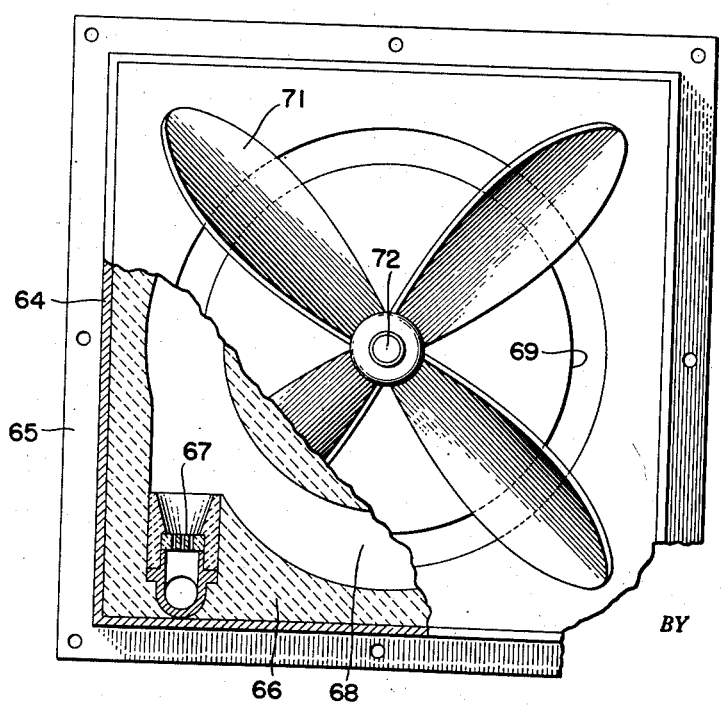
Figure 7 is a view, partly in section, of another form of the invention.

Another form that the invention may take is shown in Figure 7 of the drawing. In this figure, the heating unit is square rather than circular, and it has the advantage of being able to be placed in the brick work of a furnace wall without the necessity for the use of special shapes of bricks to receive it. In this embodiment, there is provided a metal frame 64 having a flange 65 by means of which it can be fastened in position in the furnace wall. The frame 64 may be either square or rectangular in shape and receives therein a block of refractory material 66 that is provided in diagonally displaced corners with burners 67 of the type that were described in detail in connection with Figure 6. These burners fire tangentially into an annular combustion chamber 68 that is provided with a restricted outlet 69 through which the products of combustion are discharged. It will be obvious that the combustion chamber could follow the contour of the unit, if desired, instead of being round, and that more than two burners can be used. As the products of combustion come from the slot 69, they are distributed through the oven or furnace chamber by means of a fan 71 that is mounted on a shaft 72 which is concentric with the refractory block 66. The fan shaft may be mounted on a bracket extending from the back of the unit in a manner similar to that described in connection with the other embodiments.

The operation of this embodiment of the invention is similar to that of the previously described embodiments in that fuel is supplied to a combustion chamber of an annular shape wherein it is burned. The products of combustion are discharged through a restricted slot into the stream of a fan to be distributed throughout the furnace chamber in accordance with the flow pattern of the particular fan. It will be seen that a relatively large fan can be used with a square heating unit, since the blades of the fan can be made of a length equal to the diagonal of the unit. In this embodiment, as in those previously described, combustion takes place completely in a chamber that is beyond the effect of the fan. Thus, there is no possibility for unburned gas to be distributed through the furnace chamber where it might cause an explosive atmosphere.

Convection heating units of the type disclosed herein have a wide application, since they are small in size and require practically no room in the interior of the oven or furnace being heated. A unit with an over-all diameter of twelve inches has been operated at a capacity of 100,000 B. t. u. per hour with the fuel mixture being supplied at a pressure of ten inches water column. Naturally, the capacity of the unit can be increased by increasing the fuel supply pressure. The temperature of the products of combustion discharged through the outlet from the combustion chamber is approximately 2800° F., so that the units can be used to heat a space from a very low temperature to well above 2000° F. By varying the percentages of fuel and air in the mixture supplied to the combustion chamber, the products of combustion can be oxidizing, neutral or reducing in character depending upon what is required by the material being heated.

From the above, it will be seen that I have provided a unitary, self-contained heating unit that actually forms part of the furnace wall. These units may be used singly or in groups in order to provide the hot gases necessary to heat an oven or the like by convection. This self-contained structure includes not only a means to produce the hot gases, but it also includes a means to distribute these gases through a space that is to be heated in accordance with some predetermined and desired pattern of convection currents. It will be apparent that each of the units may be supplied individually with fuel or that a group of units may be supplied together. Similarly, the fans of each unit may be driven independently or they may be driven in groups, whether they are driven by electrically connected motors or by a belt that passes around a number of the pulleys at the same time.

The unit is so designed that combustion takes place in an enlarged chamber that has a relatively small outlet. Thus, there is no possibility that the currents produced by the fan will affect the combustion process or extinguish the flame. Only products of combustion are discharged into the oven or furnace chamber to be circulated therein.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention as set forth in the appended claims, and that in some cases certain features of my invention may be used to advantage without a corresponding use of other features.

What is claimed is:

1. A unit for use in the convection heating of ovens or the like comprising means forming an annular refractory chamber having a continuous slot in one side thereof, means through which a combustible mixture is introduced into said chamber to be burned therein, the products of combustion escaping axially through said slot, a fan, means to mount said fan for rotation concentric with said chamber, a means mounted rearwardly of said chamber to rotate said fan the fan being immediately in front of said slot whereby the products of combustion are distributed by said fan as they issue from said slot.

2. A heating unit for convection heating comprising a ring of refractory material, said ring being formed with an annular combustion chamber therein that has an annular outlet on one side thereof, structure forming a manifold on the opposite side of said ring, means to supply a combustible mixture to said manifold, means extending between said manifold and said chamber through which said mixture is introduced into said chamber to be burned therein, the products of combustion being discharged in a circular sheet from said outlet, a shaft, means to mount said shaft on said unit adjacent to said manifold and for rotation concentric with said ring with one end of said shaft extending through said ring and beyond said one side thereof, and a fan mounted on said end of said shaft immediately in front of said outlet.

3. In a heating unit, the combination of a ring of refractory material, structure to support said ring in an opening in the wall of an oven or the like with one surface thereof facing the interior of the oven, said ring being formed with an annular chamber therein and an annular outlet extending between the chamber and said one surface of said ring, means to supply fuel to said chamber, a shaft journaled for rotation in said structure to the rear of and coaxial with said ring with one end extending through said ring and beyond said one surface thereof, a fan mounted on said end of said shaft immediately in front of said outlet, and means to rotate said shaft.

4. The combination of claim 3 in which said means to supply the fuel to the chamber includes an annular manifold adjacent to a surface of said ring away from the oven, and means extending between said manifold and chamber to introduce the mixture into the chamber in a plurality of streams flowing in a substantially axial direction.

5. The combination of claim 3 in which said means to supply fuel to said chamber comprises means to direct the mixture into the chamber in a substantially tangential direction.

6. In a heating unit, the combination of a metal shell adapted to be inserted in an opening in the wall of an oven or the like, a block of refractory material in said shell having a surface thereof facing the interior of the oven and an opposite surface, said block being formed with a combustion chamber therein and an exhaust opening extending from said chamber to said surface, supply means for fuel adjacent to said opposite surface of said block, means to deliver said fuel from said supply to the interior of said chamber to be burned therein, a gas distributing fan immediately in front of said exhaust opening, and means to support said fan on said shell including a shaft extending through said block and a bearing thereof mounted on said shell beyond said opposite surface of said block.

7. The combination of claim 6 in which said fan is of the axial discharge type.

8. The combination of claim 6 in which said fan is of the radial discharge type.

9. A heating unit for use in the wall of an oven or the like comprising a block of refractory material adapted to be inserted in the wall and having a combustion chamber formed therein, and an outlet from said chamber to the surface of the block facing the interior of the oven, means to supply fuel to said chamber to be burned therein, the products of combustion exhausting through said outlet, a shaft extending through said block, bearing means on said structure on the side of said block away from the oven in which said shaft is journaled, a fan on said shaft in front of said outlet, and structure to support said block and said bearing means as a self-contained unit.

10. A heating unit comprising a ring of refractory material adapted to be inserted in an opening in a wall of an oven or the like, said ring having a first surface adapted to face the interior of the oven and an opposite surface and being formed with an annular chamber and an annular slot extending between the chamber and said first surface, said chamber being formed with a plurality of substantially spherical enlargements therein, an annular manifold abutting said opposite surface, means to supply fuel to said minfold, means forming a plurality of passages extending between said minfold and each of said enlargements, a shaft, means adjacent to said opposite surface to support said shaft for rotation concentric with said ring with an end of the shaft extending through said ring and beyond said one surface, and a fan mounted on said end of said shaft and immediately in front of said annular slot.

11. A self-contained convection heating unit comprising a supporting structure adapted to be received in an opening of the wall of an oven or the like, refractory means forming a combustion chamber having an exhaust opening mounted in said structure in such a manner that the exhaust opening is directed toward the interior of the oven, means to supply fuel to said chamber to be burned therein, the products of combustion exhausting through said opening, a shaft extending through said refractory means, means on said unit to journal said shaft for rotation, said shaft having an end thereof extending beyond said exhaust opening, means to rotate said shaft, and a fan on said shaft immediately in front of said opening to distribute the products of combustion.

12. A unit for use in the convection heating of ovens or the like comprising supporting structure, a block of refractory material having oppositely disposed first and second surfaces in said structure, a bearing on said structure adjacent to said first surface, a shaft journaled in said bearing and extending through said block beyond said second surface, said block being provided with a combustion chamber therein and a slot extending from said chamber to said second surface through which products of combustion are discharged from said chamber, a fan mounted on said shaft immediately in front of said slot, means to supply fuel to said chamber, and means mounted on said structure to rotate said shaft.

References Cited in the file of this patent

UNITED STATES PATENTS

| | | |
|---|---|---|
| 2,182,497 | Longenecker | Dec. 5, 1939 |
| 2,214,503 | Landis | Sept. 10, 1940 |
| 2,285,718 | Isaacson | June 9, 1942 |
| 2,508,792 | Ludwig | May 23, 1950 |
| 2,524,272 | Sage | Oct. 3, 1950 |
| 2,579,325 | Krauss | Dec. 18, 1951 |
| 2,676,007 | Davis | Apr. 20, 1954 |
| 2,676,460 | Brown | Apr. 27, 1954 |